United States Patent
Hammes et al.

(10) Patent No.: US 10,768,291 B2
(45) Date of Patent: Sep. 8, 2020

(54) METHOD AND SYSTEM FOR OBTAINING ANGLE-DOPPLER SIGNATURES IN MIMO RADARS

(71) Applicants: IEE INTERNATIONAL ELECTRONICS & ENGINEERING S.A., Echternach (LU); UNIVERSITE DU LUXEMBOURG, Esch-sur-Alzette (LU)

(72) Inventors: Christian Hammes, Trier (DE); Yogesh Nijsure, Esch-sur-Alzette (LU); Bjorn Ottersten, Luxembourg (LU); Udo Schroder, Fohren (DE)

(73) Assignees: IEE INTERNATIONAL ELECTRONICS & ENGINEERING S.A., Echternach (LU); UNIVERSITE DU LUXEMBOURG, Luxembourg (LU)

(*) Notice: Subject to any disclaimer, the term of this patent is extended or adjusted under 35 U.S.C. 154(b) by 0 days.

(21) Appl. No.: 16/341,269

(22) PCT Filed: Oct. 4, 2017

(86) PCT No.: PCT/EP2017/075233
§ 371 (c)(1),
(2) Date: Apr. 11, 2019

(87) PCT Pub. No.: WO2018/069120
PCT Pub. Date: Apr. 19, 2018

(65) Prior Publication Data
US 2019/0346544 A1    Nov. 14, 2019

(30) Foreign Application Priority Data

Oct. 13, 2016 (LU) .......................................... 93262
Dec. 14, 2016 (LU) .......................................... 93376

(51) Int. Cl.
G01S 13/34 (2006.01)
G01S 13/42 (2006.01)
G01S 13/87 (2006.01)
G01S 13/93 (2020.01)
G01S 13/931 (2020.01)

(52) U.S. Cl.
CPC ............ *G01S 13/343* (2013.01); *G01S 13/42* (2013.01); *G01S 13/878* (2013.01); *G01S 13/931* (2013.01)

(58) Field of Classification Search
CPC ...... G01S 13/343; G01S 13/42; G01S 13/878; G01S 13/931
See application file for complete search history.

(56) References Cited

U.S. PATENT DOCUMENTS

| | | | |
|---|---|---|---|
| 2005/0237236 A1* | 10/2005 | Budic | G01S 13/003 342/159 |
| 2014/0266868 A1 | 9/2014 | Schuman | |
| 2017/0176572 A1* | 6/2017 | Charvat | H01Q 9/0428 |

OTHER PUBLICATIONS

D. Zoeke et al., "Phase Migration Effect in Moving Target Localization Using Switched MIMO Arrays," Proceedings on the 12th European Radar Conference, pp. 85-88, Sep. 2015.

(Continued)

*Primary Examiner* — Marc Anthony Armand
(74) *Attorney, Agent, or Firm* — Reising Ethington P.C.

(57) ABSTRACT

A method for obtaining an angle-Doppler signature for a target using sparse arrays in multiple-input-multiple-output (MIMO) radar, the MIMO radar including a transmit antenna array, the transmit antenna array being at least one-dimensional (e.g. 2-D, 3-D or 4-D) and having a plurality of antenna elements. The method includes generating transmit signals for transmission by the transmit antenna array, the transmit signals defining at least a first transmit trajectory (e.g. circular) of a phase center within the transmit antenna array, and transmitting the transmit signals using Amplitude Modulation on the transmit antenna array. The method further includes receiving receive signals from the target, the receive signals resulting from the incidence of the transmit signals upon the target, and determining the angle-Doppler signature from the receive signals. The first transmit trajectory is such that, in operation, the phase center undergoes non-linear motion within the transmit antenna array.

28 Claims, 5 Drawing Sheets

(56) References Cited

OTHER PUBLICATIONS

S. Yang et al., "Linear Antenna Arrays with Bidirectional Phase Center Motion", IEEE Transactions on Antennas and Propagation, vol. 53, No. 5, pp. 1829-1835, May 2005.
S. Yang et al., "Sideband Suppression in Time-Modulated Linear Arrays by the Differential Evolution Algorithm", IEEE Antennas and Wireless Propagation Letters, vol. 1, pp. 173-175, Nov. 2002.
J. Guo et al., "A Study on Linear Frequency Modulation Signal Transmission by 4-D Antenna Arrays", IEEE Transactions on Antennas and Propagation, vol. 63, No. 12, pp. 5409-5416, Dec. 2015.
D. R. Fuhrmann et al., "Transmit Beamforming for MIMO Radar Systems Using Partial Signal Correlation", pp. 295-299, 2004.
International Search Report corresponding to PCT/EP2017/075233, dated Jan. 8, 2018, 4 pages.
Written Opinion corresponding to PCT/EP2017/075233, dated Jan. 8, 2018, 6 pages.

\* cited by examiner

METHOD AND SYSTEM FOR OBTAINING ANGLE-DOPPLER SIGNATURES IN MIMO RADARS

TECHNICAL FIELD

The present invention generally relates to a wireless detection of objects using MIMO radar, e.g. for use in an automotive vehicle, and more particularly to method and system for obtaining angle-Doppler signatures using nonlinear phase center motion (PCM).

BACKGROUND OF THE INVENTION

In modern vehicles, radar systems are increasingly used, i.e. for sensing neighboring objects/targets (including other vehicles), for lane changing, collision avoidance and other driver assist functions.

Unambiguous discrimination in radar systems with respect to angle, Doppler and range remains an area of investigation. Angular resolution is physically limited by the total antenna array size. The known virtual Multiple-Input-Multiple-Output (MIMO) concept provides better angular resolution with the same number of antenna elements with respect to their phased array counterpart. The utilization of sparse arrays and orthogonal signals leads to a virtually filled array in the processing unit. Achieving orthogonality with respect to the transmit signals has been extensively discussed in the prior art.

A simple approach of enabling the virtual MIMO scheme is the Time-Division-Multiplex (TDM) MIMO principle; see D. Zoeke and A. Ziroff, "Phase migration effect in moving target localization using switched MIMO arrays," Proceedings on the 12th European Radar Conference, 2015. In this concept, the independence of waveform has been achieved by switching the transmit $T_x$ and the receive $R_x$ channels, such that all combinations of $R_x$ and $T_x$ have taken place within the coherent processing interval (CPI). Analysis of this approach leads to the understanding that the TDM MIMO concept is effectively a linear phase center motion within the antenna structure. Due to the linear phase center motion (PCM), the target angle is coded into frequency. However, if there is an additional target motion which distorts the PCM, a strong angle-Doppler coupling appears and has to be addressed. In the Zoeke and Ziroff paper, this problem is addressed by using one moving and one stationary phase. The stationary phase center (PC) is used for Doppler compensation. A problem is that this approach works only as long as no other target appears at the same range bin with a different Doppler shift. The result of the latter is that ghost targets are present within the range-angle-Doppler map.

Moreover, in the approach disclosed in the Zoeke and Ziroff paper, within an antenna array of receivers and transmitters, just one transmitter and one receiver are switched on simultaneously and the phase center is taken to discrete positions within the array. The switching schemes used are called mixed, interleaved, stacked and stacked multiple, and all lead to a linear PCM. All of such schemes are coding the angle, and exploiting the orthogonality in angle, for the virtual MIMO approach, but all are suffering from phase variations which are caused by motion target of the target. The switching scheme itself can be interpreted as a kind of phase center motion for a single trajectory. Accordingly, with the disclosed technique, only a single trajectory is used; and the trajectories presented all suffer from target Doppler shifts and therefore are not orthogonal in angle and Doppler simultaneously as it is in the case of the present invention.

In Y.-B. G. Shiwen Yang and P. K. Tan, "Linear antenna arrays with bidirectional phase center motion", IEEE Transactions on Antennas and Propagation, vol. 53, no. 5, pp. 1829-1835, May 2005, bidirectional linear phase center motion in a linear array is presented. The authors introduce Doppler shifts affected by phase center motion. Those Doppler shifts are used to shift the power of the radiation pattern side lobes into another spectrum. The Doppler shifting of side lobes is caused by the angle dependency of an effective phase center trajectory which is seen by a target in the far field.

In Y. B. G. Shiwen Yang and A. Qing, "Sideband suppression in time-modulated linear arrays by the differential evolution algorithm", IEEE Antennas and Wireless Propagation Letters, vol. 1, pp. 173-175, November 2002 and J. Guo, S. Yang, S.-W. Qu, J. Hu, and Z. Nie, "A study on linear frequency modulation signal transmission by 4-d antenna arrays", IEEE Transactions on Antennas and Propagation, vol. 63, no. 12, pp. 5409-5416, December 2015, further studies were done with respect to applying a radiation pattern design algorithm and other forms of switching of the antenna center other than the linear approach. However, the disclosed techniques all involve a single-trajectory approach and are not concerned with orthogonality in trajectory.

In D. R. Fuhrmann and G. S. Antonio, "Transmit beamforming for mimo radar systems using partial signal correlation", 2004, a model is provided that uses only correlation between antenna elements, i.e. only space correlation, with no time correlation.

SUMMARY

A problem addressed by the present invention is how to reduce angle-Doppler ambiguity and improve discrimination in the detection of targets.

In order to overcome the abovementioned problem, the present invention in at least some embodiments provides a method for obtaining an angle-Doppler signature for a target or multiple targets using multiple-input-multiple-output (MIMO) radar, the MIMO radar including a transmit antenna array, the transmit antenna array being at least one-dimensional and having a plurality of antenna elements. The method comprises generating transmit signals for transmission by the transmit antenna array, the transmit signals defining at least a first transmit trajectory of a phase center within the transmit antenna array, and transmitting the transmit signals using the transmit antenna array. The method further comprises receiving receive signals from the target, the receive signals resulting from the incidence of the transmit signals upon the target (and subsequent reflection from the target), and determining the angle-Doppler signature from the receive signals. The first transmit trajectory is such that, in operation, the phase center undergoes nonlinear motion within the transmit antenna array.

This method may be used to solve the problem of angle-Doppler ambiguity by nonlinear PCM. The PCM is used for an unambiguous angle-Doppler coding.

Preferably, the MIMO radar includes a receive antenna array, the receive antenna array being at least one-dimensional and having a plurality of antenna elements. Preferably, receiving the receive signals from the target comprises receiving the receive signals using the receive antenna array;

and the receive signals define at least a first receive trajectory of a phase center within the receive antenna array.

The first transmit trajectory and the first receive trajectory may correspond to each other or be identical.

Preferably, the first transmit trajectory and/or the first receive trajectory correspond to an amplitude modulation (AM) of the transmit signals. Preferably, the transmit signals are given by $$x(t) = w_{Tx}(t)e^{j\left(\omega_0 t + \frac{B}{T_c}t^2\right)}$$

where the vector $w_{Tx}(t)$ represents the AM, B is the chirp bandwidth and $T_c$ the chirp duration.

The receive signals may be given by $$y(t) = \sum_{k=1}^{K} A_k e^{j\omega_{Dk} t} S_k w_{Tx}(t) e^{j\left(\omega_0\left(t - \frac{r_k}{c_0}\right) + \frac{B}{T_c}\left(t - \frac{r_k}{c_0}\right)^2\right)}$$

where $\omega_0$ is the carrier angular frequency, $S_k$ is the MIMO channel matrix, $A_k$ is the k-th target radar cross section, $\omega_{Dk}$ is the k-th target Doppler shift, K is the total number of targets, $r_k$ is the target range, and $c_0$ is the speed of light.

The method preferably further comprises down mixing the receive signals y(t) to obtain the down-mixed signal $y_{DM}(t)$, given by $$y_{DM}(t) = \sum_{k=1}^{K} c_k A_k e^{j\omega_{Dk} t} e^{-j\left(2\frac{Br_k}{T_c c_0}t\right)} S_k w_{Tx}(t)$$

where $$c_k = e^{-j\left(\omega_0 \frac{r_k}{c_0} - \frac{B}{T_c}\left(\frac{r_k}{c_0}\right)^2\right)}$$

$$f_{Bk} = \frac{B}{\pi T_c}\frac{r_k}{c_0}$$

The method preferably further comprises transforming the down-mixed signal $y_{DM}(t)$ to the discrete time domain to obtain baseband signals $y_{BB}(i_s)$, given by $$y_{BB}(i_s) = \sum_{k=1}^{K} c_k A_k e^{j\omega_{Dk} i_s T_s} e^{j(\omega_{Bk} i_s T_s)} S_k w_{Tx}(i_s T_s)$$

where $\omega_0$ is the carrier angular frequency, $\omega_{Bk}$ is the range corresponding beat frequency with regards to FMCW, $S_k$ is the MIMO channel matrix, $A_k$ is the k-th target radar cross section, $\omega_{Dk}$ is the k-th target Doppler shift, K is the total number of targets, $r_k$ is the target range, and $c_0$ is the speed of light.

The method preferably further comprises deriving, from the baseband signals $y_{BB}(i_s)$, a Doppler signature $y_{DS}(i_c)$, given by $$y_{DS}(i_c) = \sum_{k=1}^{K} c_k A_k e^{j\omega_{Dk} i_c T_c} S_k w_{Tx}(i_c T_c)$$

where $S_k w_{Tx}(i_c T_c)$ is a group factor $G_{Tx}$ of the transmit antenna array, given by $$G_{Tx}(i_c) = \sum_{n=1}^{N} w_{Txn}(i_c T_c) e^{jk_0 \sin(\phi_k) d_{Tx} n}$$

where $d_{Tx}$ is the inter-element spacing of transmit antenna elements, $\phi_k$ is the k-th target angle of arrival, $w_{Txn}$ is the n-th element of the amplitude modulation vector $w_{Tx}$, N is the total number of elements within $w_{Tx}$, and $k_0$ is the free space wave number. The AM vector $w_{Tx}$ comprises the transmit phase center.

Preferably, the first transmit trajectory and/or the second transmit trajectory are formed using a phase center position $x_{PC}$ defined by $$x_{PC}(i_c) = \frac{\partial}{\partial k_x} \arg(G_{Tx}(i_c))$$

where $k_x = k_0 \sin(\phi_k)$.

It should be noted that the above described embodiments only provide one possible way of achieving the said processing. The skilled person will easily understand that the method can be extended to multiple trajectories. The key is the choice of $w_{Tx}$ and $w_{Rx}$.

Preferably, the first transmit trajectory and/or a second or further transmit trajectory are formed such that the motion of the respective phase center is sinusoidal. The method preferably further comprises deriving a Doppler signature $y_{DS}(i_c)$ from the receive signals according to $$y_{DS}(i_c) = c_k A_k e^{j\omega_{Dk} i_c T_c} e^{-jk_0 \sin(\phi_k) x_0 \sin(\omega_{CPI} T_c i_c)}$$

where $\omega_{CPI}$ is an angular frequency for a coherent processing interval (CPI) and is given by $$\omega_{CPI} = \frac{2\pi}{I_c T_c}$$

Preferably, determining the angle-Doppler signature from the receive signals comprises using a filter bank wherein every combination of p and q is related to one filter of the filter bank resp. where each filter of the filter bank corresponds to a combination of p and q such that each filter is given by $$y_{pq}(i_c) = e^{j\omega_{Dq} i_c T_c - jR_p \sin(\omega_{CPI} T_c i_c)}$$

where $$R_p = p\pi$$

$$\omega_{Dg} = q\omega_{CPI}$$

Preferably, the output of the filter bank is calculated as $$\hat{J}_{pq} = \sum_{i_c=1}^{I_c} c_k A_k e^{j(\omega_{Dk} - \omega_{Dq}) i_c T_c - j(R_k - R_p)\sin(\omega_{CPI} T_c i_c)}$$

where $$R_k = \sin(\phi_k) k_0 x_0$$

The method preferably further comprises deriving the Doppler from the order of output of the filter bank. For sinusoidal PCM, the filter bank output has e.g. a discrete Bessel function characteristic. The order of Bessel function represents the Doppler domain and the argument is associated with the target angle. Therefore, the Bessel function provides the ambiguity function for angle-Doppler discrimination in accordance to sinusoidal PCM.

If the order of Bessel function represents the Doppler domain and the argument is associated with the target angle, the method preferably further comprises deriving a target angle from the argument of the output of the filter bank.

Preferably, the at least a first transmit trajectory comprises at least a first transmit trajectory and a second transmit trajectory and/or the at least a first receive trajectory comprises at least a first receive trajectory and a second receive trajectory.

Further with respect to sinusoidal PCM and its Bessel characteristic, the frequency of the first receive trajectory is preferably different to that of the first transmit trajectory and/or the second receive trajectory is different to that of the second transmit trajectory. A possible embodiment may e.g. implement orthogonality among different trajectory signatures.

Preferably, the frequency of the first receive trajectory is half that of the first transmit trajectory and/or the second receive trajectory is half that of the second transmit trajectory.

Preferably, the first transmit trajectory and the second transmit trajectory have different starting points and/or the first receive trajectory and the second receive trajectory have different starting points.

Preferably, the first transmit trajectory is one of sine and cosine and the second transmit trajectory is the other of sine and cosine and/or the first receive trajectory is one of sine and cosine and the second receive trajectory is the other of sine and cosine. It should be noted that the sine and cosine may have the same phases (starting points) or that they may have different phases.

Preferably, the transmit antenna array and the receive antenna array are 2-dimensional or the transmit antenna array and the receive antenna array are 3-dimensional.

Preferably, determining the Doppler signature from the receive signals comprises determining an angle-Doppler signature $y_{DS}(i_c)$ as $$y_{DS}(i_c) = \sum_{k=1}^{K} c_k A_k e^{j\omega_{Dk} i_c T_c} e^{-jk_0 \sin(\phi_k) x_{PC}(i_c)}$$

where $A_k$ is the k-th target radar cross section, K is the total number of targets, $\omega_{Dk}$ is the k-th target Doppler shift, $T_c$ is the chirp duration, $k_0$ is the free space wave number, $\phi_k$ is the k-th target angle of arrival, $x_{PC}(i_c)$ is the phase center trajectory in x-direction.

In a possible embodiment, the method comprises determining an argument of angle-Doppler signature $y_{DS}(i_c)$ as $$\varphi_k(t) = \vec{k}_k \cdot \vec{x}_{PC}(i_c)$$

$$\vec{k}_k = k_0 \begin{pmatrix} \cos(\phi_k)\cos(\theta_k) \\ \sin(\phi_k)\cos(\theta_k) \\ \sin(\theta_k) \end{pmatrix}$$

where $\vec{x}_{PC}$ is the phase center trajectory on a 3 dimension structure, $k_0$ is the free space wave number and $\phi_k$ the k-target angle of arrival; and discriminating targets based on the determined $\varphi_k(t)$ The method preferably further comprises determining a Doppler $\omega_{Dk}$ from $$\varphi_k(t) = \vec{k}_k \cdot \vec{x}_{PC}(i_c) + \omega_{Dk} t$$

where $\vec{x}_{PC}$ is the phase center trajectory on a 3 dimension structure and $\omega_{Dk}$ is the k-th target Doppler shift; and discriminating targets based on the determined $\omega_{Dk}$.

According to another aspect of the invention, there is provided a system for obtaining an angle-Doppler signature for a target using multiple-input-multiple-output (MIMO) radar, the system comprising: a transmit antenna array, the transmit antenna array being at least one-dimensional and having a plurality of antenna elements; and processing circuitry, coupled to the transmit antenna array, the processing circuitry being configured to carry out the method of any of claims 1 to 25 of the appended claims.

The system preferably further comprises a receive antenna array coupled to the processing circuitry, the receive antenna array being at least one-dimensional and having a plurality of antenna elements.

According to another aspect of the invention, there is provided a non-transitory computer readable medium storing instructions which, when executed by processing circuitry, perform the method of any of claims 1 to 25 of the appended claims.

The technique described herein involves a new signal model which includes not only time dependency. In addition, it provides phase center motion as a design parameter and a new degree of freedom, opening new avenues to transmit signal design. PCM can be seen as a new framework for the design of transmit signal (models) and appropriate receiver correlator (filter) banks. The effect of switching the antenna elements, or virtually moving the phase center of radiation, amounts to the introduction of a Doppler shift of the received signal. The system according to the invention introduces orthogonal Doppler and angle signatures, as well as independent PCM trajectories, over the antenna array. Such a system design has, to date, not been realized.

An advantage of the invention, in at least some embodiments, is to reduce angle-Doppler ambiguity, to improve discrimination in the detection of targets and to use less antenna elements.

BRIEF DESCRIPTION OF THE DRAWINGS

Further details and advantages of the present invention will be apparent from the following detailed description of not limiting embodiments with reference to the attached drawing, wherein.

DESCRIPTION OF THE ILLUSTRATED EMBODIMENTS

In the following, like numerals will be used to indicate like elements.

Nonlinear PCM Virtual MIMO

In order to achieve a nonlinear PCM, either the antenna elements are nonlinearly distributed and switched in equidistant time instances or the antenna elements are linearly distributed and the modulation scheme has be more advanced. Technically speaking, the switching is a binary amplitude modulation (AM). Therefore, a nonlinear PCM is a type of advanced AM. For a detailed investigation, a suitable signal model is used. As PCM can be seen as an AM and a FMCW scheme is used, the system model can be illustrated as in FIG. 1. It will be understood by the skilled person that the FMCW scheme is only used as an example and that the invention is not at all limited to FMCW.

The lines on the array illustrate the trajectories. As we will be seen, there is a transmit trajectory design and a receive trajectory design. The transmit trajectory design involves an AM and the received trajectory design involves the design of time dependent digital filter.

Figure 1:
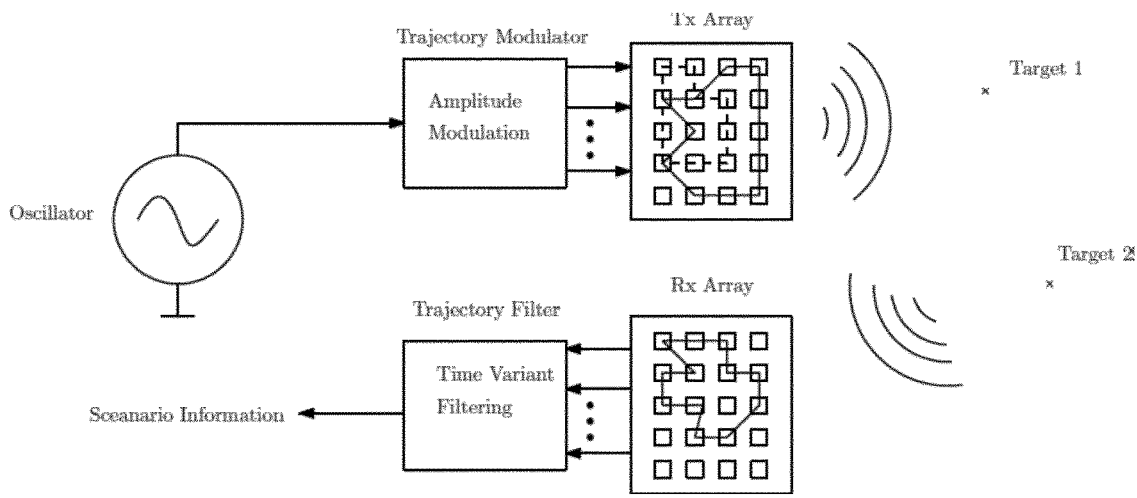
FIG. 1 shows schematically a System Model for a FMCW PCM system according to an embodiment.
Figure 1A:
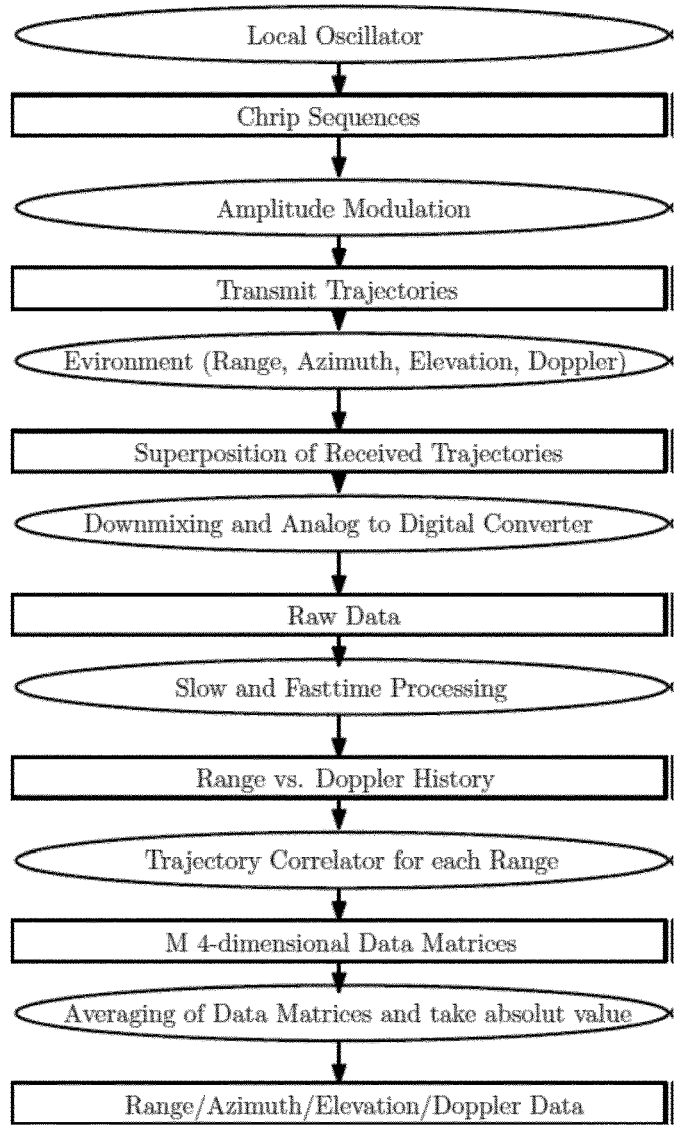
FIG. 1A provides a schematic flow diagram of the processing carried out by the system of FIG. 1

FIG. 1A provides a schematic flow diagram of the processing carried out by the system of FIG. 1. On the transmit side, initially, a local oscillator operates to generate chirp sequences. The chirp sequences undergo amplitude modulation in order to generate transmit trajectories. After incidence upon and reflection back from the environment (including one or more targets) receive signals (trajectories) embodying data on Range, Azimuth, Elevation and Doppler of such entities) are received and superposed.

At the receiver side, the superposed received trajectories are down-mixed and converted from analog to digital, to produce raw (trajectory) data. The raw data undergoes slow- and fast-time processing to generate Range vs Doppler history data. From these, and using the filter bank, a trajectory correlator (filter) for each Range is selected and operates to produce M 4-dimensional date matrices. Once obtained, the matrices are averaged and an absolute value thereof determined. The output of this operation is the Range, Azimuth, Elevation and Doppler data.

A. Signal Model for Frequency Modulated Continuous Wave (FMCW)

Figure 2:
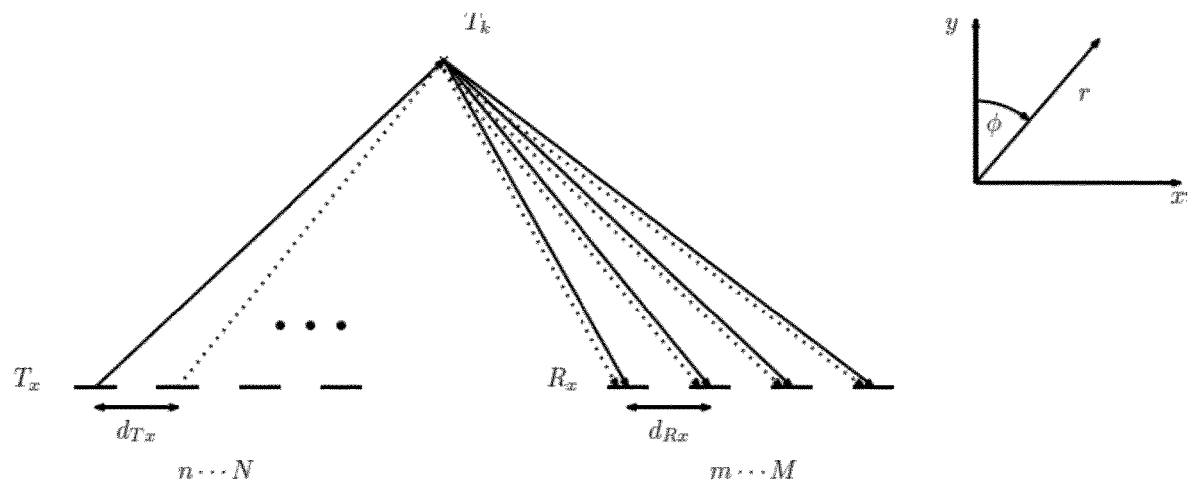
FIG. 2 is shows a MIMO channel matrix used in an embodiment.

As is known, signal models for signal propagation are formulated in the frequency domain. MIMO models use a channel matrix S in order to model every signal propagation path in a MIMO configuration. Each matrix element represents another signal path, as illustrated in FIG. 2.

If the array size is much smaller than the distance between the target(s) and the antenna array, the channel matrix can be written for a uniform linear array as:

$$S_k = \begin{pmatrix} e^{j\varphi_{11}} & \cdots & e^{j\varphi_{1N}} \\ \vdots & \ddots & \vdots \\ e^{j\varphi_{M1}} & \cdots & e^{j\varphi_{MN}} \end{pmatrix}$$

where $$\varphi_{nm} = \frac{2\pi}{\lambda}\sin(\phi_k)((m-1)d_{Rx} + (n-1)d_{Tx})$$

$$\lambda = \frac{f_0}{c_0}$$

$$k_0 = \omega_0 c_0$$

$f_0$ is the carrier frequency of transmitted signal and $c_0$ is the speed of light. $\lambda$ is the wavelength and $k_0$ the wavenumber. $d_{Rx}$ and $d_{Tx}$ are the spacings between the receive and transmit antenna elements, respectively. The channel matrix is a function of the k-th target angle $\phi_k$. Due to the frequency domain formulation and an assumption of isotropic and non-coupled antenna elements, the received signal is the superposition of multiple targets with a certain radar cross section $A_k$ and Doppler shift $\omega_{Dk}$ for the k-th target.

$$y(\omega) = \sum_{k=1}^{K} A_k e^{jk_0 r_k} S_k x(\omega) * \delta(\omega - \omega_{Dk})$$

where $x(\omega)$ represents the output vector of the transmit array and $y(\omega)$ is the input vector of the received array. * is the convolution operator and $\delta(\omega)$ denotes the delta distribution. The channel matrix includes only very small phase shifts with respect to the huge distance between antenna array and target. Therefore, the signal model in the time domain can be written as:

$$y(t) = \sum_{k=1}^{K} A_k \left(e^{j\omega_{Dk}t} S_k x(t)\right) * \delta\left(t - \frac{r_k}{c_0}\right)$$

Returning to the PCM problem, the goal is to discriminate between Doppler and angle information of multiple targets by using an amplitude modulation. An AM for each antenna element must be considered, therefore x(t) is written as a FMCW signal which is weighted by time dependent coefficients. The vector $w_{Tx}(t)$ represents the AM.

$$x(t) = w_{Tx}(t) e^{j\left(\omega_0 t + \frac{B}{T_c}t^2\right)}$$

where B is the chirp bandwidth and $T_c$ the chirp duration. If the AM is much slower than the change in frequency (chirp rate) and the Doppler frequency is also very low, then the received signal model can be formulated as:

$$y(t) = \sum_{k=1}^{K} A_k e^{j\omega_{Dk}t} S_k w_{Tx}(t) e^{j\left(\omega_0\left(t - \frac{r_k}{c_0}\right) + \frac{B}{T_c}\left(t - \frac{r_k}{c_0}\right)^2\right)}$$

The next step is down mixing the signal. The down-mixed signal $y_{DM}(t)$ is derived as $$y_{DM}(t) = y(t)e^{-j\left(\omega_0 t + \frac{B}{T_c}t^2\right)}$$

$$= \sum_{k=1}^{K} c_k A_k e^{j\omega_{Dk}t} e^{-j\left(2\frac{Br}{T_c}\frac{k}{c_0}t\right)} S_k w_{Tx}(t)$$

where $$c_k = e^{-j\left(\omega_0 + \frac{r_k}{c_0} - \frac{B}{T_c}\left(\frac{r_k}{c_0}\right)^2\right)}$$

$$f_{Bk} = \frac{B}{\pi T_c}\frac{r_k}{c_0}$$

$f_{Bk}$ is k-th target beat frequency which includes the range information. Now it is assumed that the phase center (PC) is constant within one frequency sweep. If a sequence of FMCW chirps are transmitted, each chirp is related to a certain phase center. This enables fast and slow time processing to be applied, such that the PCM information is in the Doppler domain. It is a reasonable assumption that the Doppler shift remains constant within one sweep. Therefore, the signal model may be formulated in the time discrete domain, to derive a base band sequence $y_{BB}$, given by $$y_{BB}(i_s) = y_{DM}(i_s T_s)$$

$$= \sum_{k=1}^{K} c_k A_k e^{j\omega_{Dk} i_s T_s} e^{j(\omega_{Bk} i_s T_s)} S_k w_{Tx}(i_s T_s)$$

Figure 3:
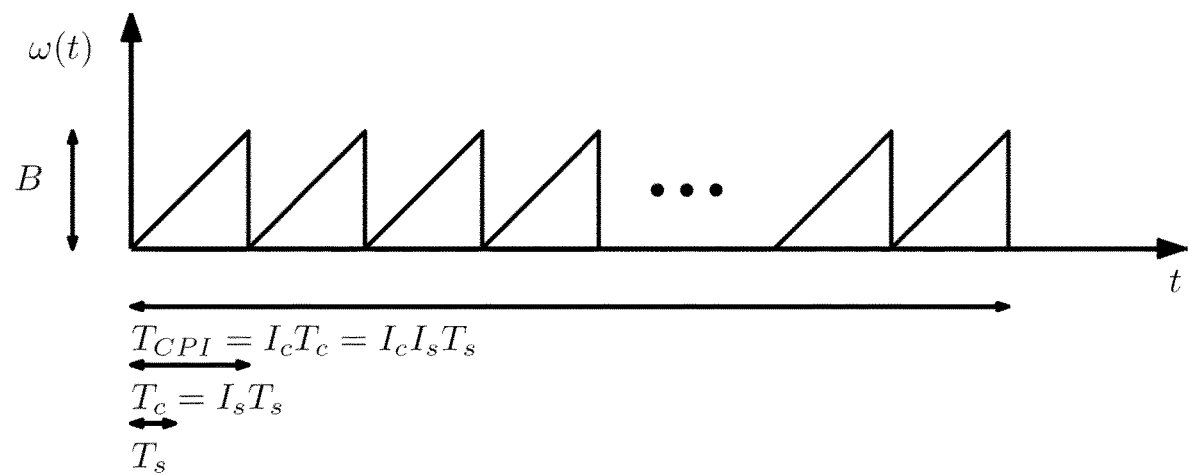
FIG. 3 shows a time basis of chirp sequences used in an embodiment.

Now, the base band sequence $y_{BB}$ is cut every $I_S$ sample in a total number $I_C$ cuts and a matrix is formed from it. FIG. 3 illustrates that the matrix contains in raw form the different chip signals.

For the sake of simplicity, the number of receivers is equal to one (M=1). If Doppler and phase center motion (PCM) are approximately constant within one sweep, then the range is then separated from PCM and Doppler. The range Doppler matrix $M_{RD}$ can be written in vector notation, as follows.

$$M_{RD} = \sum_{k=1}^{K} c_k A_k \begin{pmatrix} e^{j(\omega_{Bk} 1 T_s)} S_k w_{Tx}(1 T_s) \\ \vdots \\ e^{j(\omega_{Bk} I_c T_s)} S_k w_{Tx}(I_c T_s) \end{pmatrix} \left( e^{j\omega_{Dk} 1 T_s} \quad \ldots \quad e^{j\omega_{Dk} I_s T_s} \right)$$

The range vector represents a fast time vector and the Doppler/PCM signature a slow time vector. A Fourier transform of the fast time vector provides range associated beat frequencies for the k-th target. The Doppler signature $y_{DS}(i_c)$ contains the angle and Doppler information which has to be extracted with the help of PCM. The Doppler signature is given by $$y_{DS}(i_c) = \sum_{k=1}^{K} c_k A_k e^{j\omega_{Dk} i_c T_c} S_k w_{Tx}(i_c T_c)$$

The expression $S_k w_{Tx}(i_c T_c)$ contains the phase center motion information and this term is effectively a group factor of the transmit antenna array. A deeper study of the group factor provides the phase center information.

B. PC and Fractional Spatial Delay Filter

As aforementioned above, the expression $S_k w_{Tx}(i_c T_c)$ can be seen as the transmit array group factor $G_{Tx}$.

$$G_{Tx}(i_c) = S_k w_{Tx}(i_c T_c) = \sum_{n=1}^{N} w_{Txn}(i_c T_c) e^{jk_0 \sin(\phi_k) d_{Tx} n}$$

Neglecting the time dependency leads to an expression of the discrete spatial Fourier transform, where $d_{Tx}$ is the spatial sampling and $k_x = k_0 \sin(\phi_k)$ the spatial frequency, which is a function of the radiation angle. The output of the group factor is complex and can be divided into magnitude and phase as a function of target angle $\phi$. A phase center is by definition the center of radiation which is seen by an observer which is far away from the antenna structure. Therefore, the antenna array can be seen as a spatial finite impulse response (FIR) filter where the group delay is equivalent to the phase center position $x_{PC}$, the latter being given by $$x_{PC}(i_c) = \frac{\partial}{\partial k_x} \arg(G_{Tx}(i_c))$$

The group delay of the general FIR-Filter is to a good approximation constant within a certain frequency band. The same problem of constancy appears for the phase center. The frequency band is equivalent to a certain field of view (FOV). The magnitude of the group factor represents the radiation pattern of the antenna array, which can be seen as an additional design parameter.

An example for a spatial fractional delay filter involves the utilization of sinc like amplitude modulation for the antenna elements.

$$G_{Tx}(i_c) = \sum_{n=1}^{N} \text{sinc}(nd_{Tx} - x_{PC}(i_c)) e^{jk_0 \sin(\phi_k) d_{Tx} n} \approx e^{jk_0 \sin(\phi_k) x_{PC}(i_c)}$$

If the filter length is large enough, the radiation characteristic remains isotropic and the phase center can have any arbitrary position within the array. Therefore, it is possible to design nonlinear phase center motion within a uniform liner array.

C. Virtual MIMO and PCM

Up to now, it has been discussed only how to move the phase center for the transmit array. The same can be done for the receive array—by the multiplication of time dependent receive weighting vector $w_{Rx}(i_c)$ with the receive signal vector $y_{DS}$. The result is the design of the receive group factor $G_{Rx}$. The latter is given by $$G_{Rx}(i_c) = w_{Rx}(i_c) y_{DS}(i_c)$$

$$= c_k A_k e^{j\omega_{Dk} i_c T_c} w_{Rx}(i_c) S_k w_{Tx}(i_c)$$

A detailed investigation of $w_{Rx}(i_c) S_k w_{Tx}(i_c)$ yields a sequential spatial filtering. It can be derived that the PC of the receiver and transmitter are added, as follows:

$$x_{PC}(i_c) = x_{PC_{Tx}}(i_c) + x_{PC_{Rx}}(i_c)$$

Now, the virtual MIMO concept is introduced.

Figure 4:
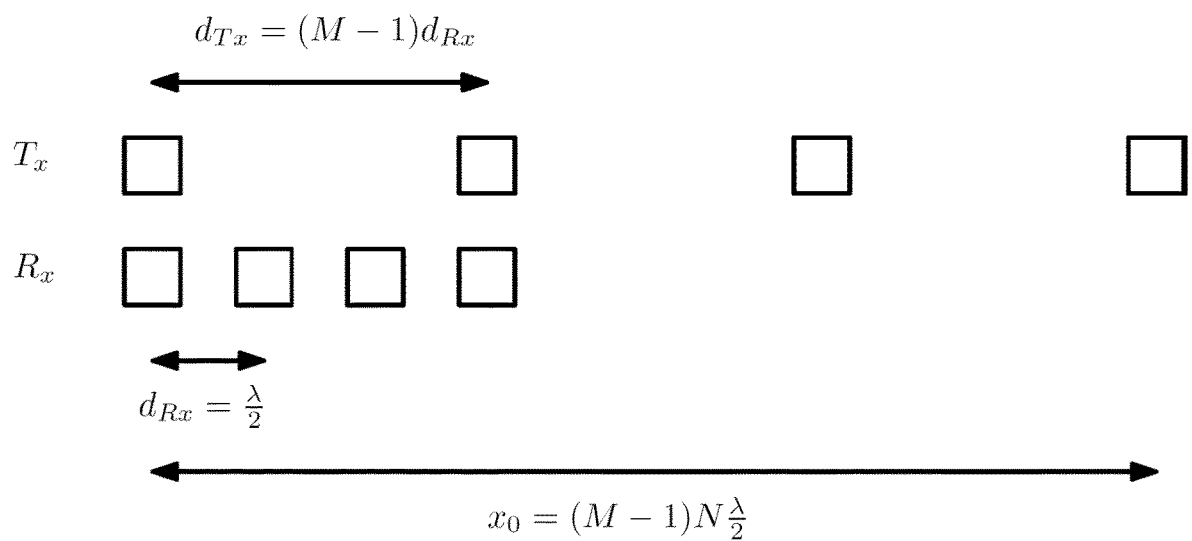
FIG. 4 shows a Virtual Array Configuration used in an embodiment.

FIG. 4 shows a virtual array configuration used in an embodiment.

An AM for the transmit chain which fits the sinc-function is in practice hard to achieve. For the transmit part, the antennas are simply being switched on or off depending on the desired PC position. On the $R_x$ chain, it is digitally very easy to set the coefficients $w_{Rx}$ like a sinc-function. A real number is obtained for PC positions for $R_x$ and discrete one for $T_x$ (depending on their phase center positions, see FIG. 4). The resulting PC is the superposition of $x_{PC_{Rx}}$ and $x_{PC_{Tx}}$ and therefore any real phase center position can be adjusted within the array length $x_0$.

As will be seen below, the angular resolution depends on the array size $x_0$. The virtual array size is $$(M-1)N\frac{\lambda}{2}$$

for such an approach.
Sinusoidal PCM
A. Angle-Doppler Discrimination

As mentioned above, every PC position, and therefore every PCM, can be freely adjusted within the array structure, even if this structure is sparse. Furthermore, it has been shown that the PCM merely involves an amplitude modulation. According to embodiments, trajectory can be designed arbitrarily. This circumstance yields the following expression for a Doppler signature $y_{DS}$ according to at least some embodiments of the invention.

$$y_{DS}(i_c) = \sum_{k=1}^{K} c_k A_k e^{j\omega_{Dk} i_c T_c} e^{jk_0 \sin(\phi_k) x_{PC}(i_c)}$$

For the sake of simplicity, only the k-th targets Doppler signature for a sinusoidal
PCM are considered.

$$y_{DS}(i_c) = c_k A_k e^{j\omega_{Dk} i_c T_c} e^{-jk_0 \sin(\phi_k) x_0 \sin(\omega_{CPI} T_c i_c)}$$

If only one forward and backward motion within the array are used, $w_{CPI}$ can be defined as:

$$\omega_{CPI} = \frac{2\pi}{T_c} = \frac{2\pi}{I_c T_c}$$

Definitions $R_k = \sin(\phi_k) k_0 x_0$ $$y_{DS}(i_c) = c_k A_k e^{j\omega_{Dk} i_c T_c} e^{-jk_0 \sin(\phi_k) x_0 \sin(\omega_{CPI} T_c i_c)}$$

In order to extract $\phi_k$ or $R_k$, respectively, and $\omega_{Dk}$, a filter bank is designed, where every combination of p and q is related to one filter, whereby:

$$y_{pq}(i_c) = e^{j\omega_{Dq} i_c T_c - j R_p \sin(\omega_{CPI} T_c i_c)}$$

where $R_p = p\pi$ $\omega_{Dg} = q\omega_{CPI}$

The filter output can be calculated as:

$$\hat{J}_{pq} = \sum_{i_c=1}^{I_c} y_{pq}(i_c) * y_{DS}(i_c)$$

-continued $$= \sum_{i_c=1}^{I_c} c_k A_k e^{j(\omega_{Dk} - \omega_{Dq}) i_c T_c - j(R_k - R_p) \sin(\omega_{CPI} T_c i_c)}$$

$$= \sum_{i_c=1}^{I_c} c_k A_k e^{j\left(\frac{\omega_{Dk}}{\omega_{CPI}} - q\right) \omega_{CPI} i_c T_c - j(R_k - R_p) \sin(\omega_{CPI} T_c i_c)} \leftrightarrow$$

$$J_{\frac{\omega_{Dk}}{\omega_{CPI}} - q}(R_k - R_p)$$

$$\frac{\hat{J}_{pq}}{c_k A_k} = \sum_{i_c=1}^{I_c} e^{j\left(\frac{\omega_{Dk}}{\omega_{CPI}} - q\right) \omega_{CPI} i_c T_c - j(R_k - R_p) \sin(\omega_{CPI} T_c i_c)}$$

Figure 5:
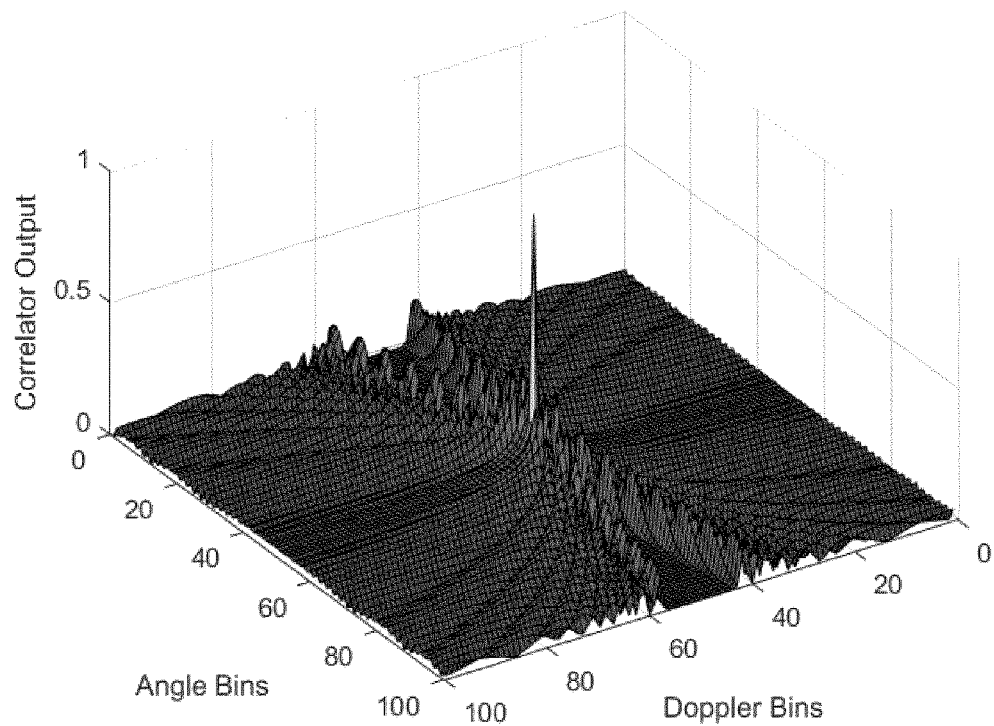
FIG. 5 shows an Angle-Doppler Bessel Ambiguity Function used in an embodiment.

The filter bank output has a discrete Bessel function characteristic. The order of Bessel function represents the Doppler domain and the argument is associated with the target angle. Therefore, the Bessel function provides the ambiguity function for angle-Doppler discrimination in accordance with sinusoidal PCM. FIG. 5 shows an Angle-Doppler Bessel Ambiguity Function used in an embodiment. An advantage is that this technique can distinguish between multiple targets within the same range Doppler bin, unlike the TDM MIMO approach.

For the multiple target case, the filter output becomes a superposition of Bessel functions.

$$\hat{J}_{pq} = \sum_{k=1}^{K} c_k A_k J_{\frac{\omega_{Dk}}{\omega_{CPI}} - q}(R_k - R_p)$$

B. Orthogonality in Trajectory

Figure 6:
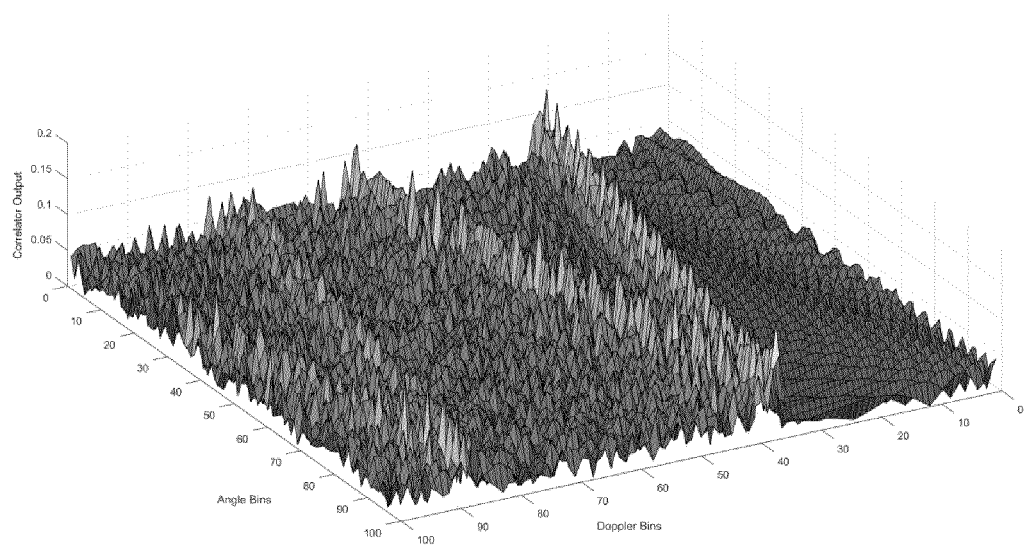
FIG. 6 shows a Filter Bank Output with Uncorrelated Phase Center Velocity in an embodiment.

It is well known of Bessel functions that they are orthogonal in frequency. The Bessel characteristic in the circular technique according to an embodiment arises from the use of sinusoidal nonlinear PCM within the array. Therefore, it is reasonable to assume that two sinusoidal trajectories with different frequencies are orthogonal to each other. FIG. 6 shows the correlator bank output for a non matched trajectory. The transmitted trajectory has twice the angular velocity of the filter bank velocity.

Figure 7:
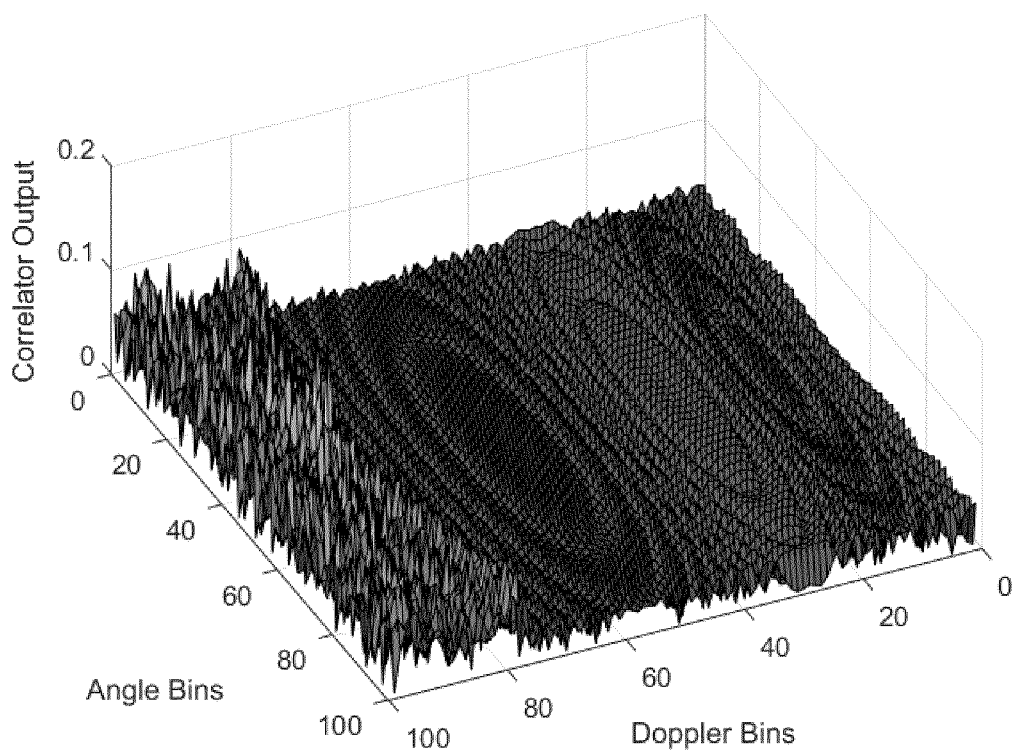
FIG. 7 shows a Filter Bank Output for different Phase Center Starting Points in an embodiment.

Another embodiment involves the choice of different phase center starting points. For instance, one trajectory has a cosine non linearity and the other a sine non linearity. FIG. 7 shows a filter bank output for different phase center starting points in an embodiment. FIG. 7 illustrates good suppression of a cosine trajectory with respect to a sine filter bank.

The introduction of multiple trajectories requires parallel spatial receive filter and advanced transmit AM.

Arbitrary Trajectory within 3-D Arbitrary Array Structure

The PCM techniques according to various embodiments of the invention is not limited to one dimensional arrays and is not restricted to sinusoidal trajectories. As demonstrated earlier, the capability of angle and Doppler discrimination is achieved by using the trajectory approach. Therefore, a transformation of the transmitted trajectory phase code in accordance with the target velocity and the target angular position can be considered. In the following, angle and Doppler discrimination as the trajectory transformation is addressed by using the circular PCM technique, and it can be easily extended to arbitrary trajectories.

If there exists such a transformation between (i) trajectory and angle or (ii) trajectory and Doppler, respectively, and further as already mentioned a transformation between trajectory and amplitude modulation, a reverse approach can be considered—where we design a signal code for the target and then the suitable AM or trajectory, respectively. The same concept can be used for exploiting orthogonality in trajectory.

A. Angle Discrimination

The issue of how a trajectory is transformed by the target angle will now be considered. The expression for the Doppler signature provides for what the transformation looks like. The Doppler signature is given by $$y_{DS}(i_c) = \sum_{k=1}^{K} c_k A_k e^{j\omega_{Dk} i_c T_c} e^{-jk_0 \sin(\phi_k) x_{PC}(i_c)}$$

For an one-dimensional array, the trajectory $x_{PC}(i_c)$ is scaled or transformed by $\sin(\phi_k)$. As a target sees the antenna array as a point source, the transmitted field radiates in the radial direction. The propagation vector can be written as:

$$\vec{k}_k = k_0 \begin{pmatrix} \cos(\phi_k)\cos(\theta_k) \\ \sin(\phi_k)\cos(\theta_k) \\ \sin(\theta_k) \end{pmatrix} = \begin{pmatrix} k_{xk} \\ k_{yk} \\ k_{zk} \end{pmatrix}$$

If the trajectory is within a three-dimensional array, the PCM has to be described with thee vector components:

$$\vec{x}_{PC}(i_c) = \begin{pmatrix} x_{PC}(i_c) \\ y_{PC}(i_c) \\ z_{PC}(i_c) \end{pmatrix}$$

Therefore, a more general expression for the Doppler signature is:

$$y_{DS}(i_c) = \sum_{k=1}^{K} c_k A_k e^{j\omega_{Dk} i_c T_c} e^{-j\vec{k}_k \cdot \vec{x}_{PC}(i_c)}$$

where * denotes the scalar product.

Figure 8:
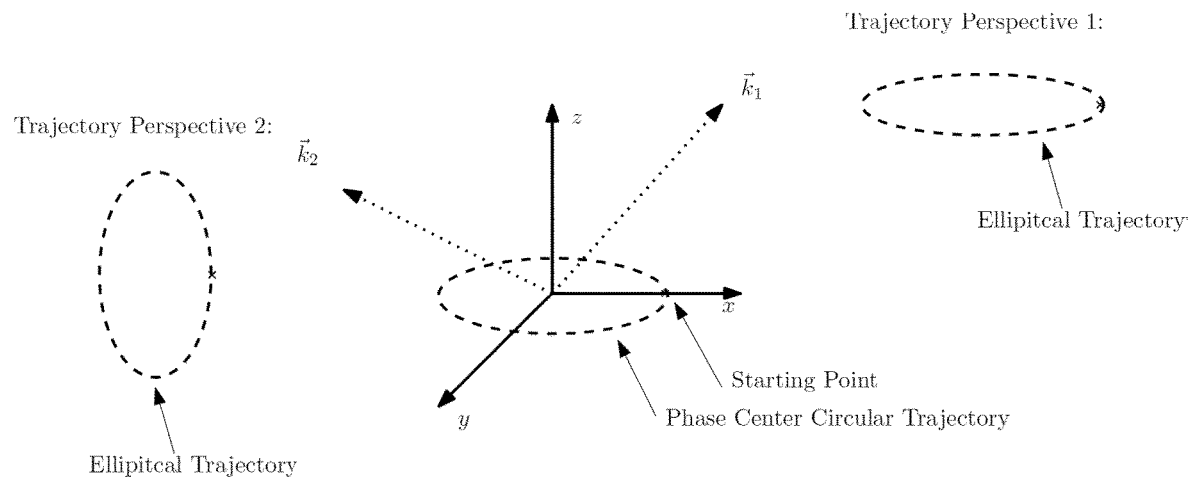
FIG. 8 illustrates a Target Angle and Trajectory Transformation in an embodiment.

FIG. 8 illustrates a target angle and trajectory transformation in an embodiment. As depicted in FIG. 8, the trajectory is circular with radius R within the xy-plane and with angular velocity $\omega_{circ}$. The trajectory is described by $$\vec{x}_{PC}(i_c) = R \begin{pmatrix} \cos(\omega_{circ} T_c i_c) \\ \sin(\omega_{circ} T_c i_c) \\ 0 \end{pmatrix}$$

In FIG. 8, target one has its position in the xz-plane ($\phi_k=\phi_1$ and $\theta_k=\theta_1$) and target two lies in the yz-plane ($\phi_k=\phi_2$ and $\theta_k=\theta_2$).

The argument of the Doppler signature for the PCM can be written as:

$$\varphi_k(t) = \vec{k}_k \cdot \vec{x}_{PC}(i_c)$$

$$= k_0 R \begin{pmatrix} \cos(\phi_k)\cos(\theta_k) \\ \sin(\phi_k)\cos(\theta_k) \\ \sin(\theta_k) \end{pmatrix} \cdot \begin{pmatrix} \cos(\omega_{circ} T_c i_c) \\ \sin(\omega_{circ} T_c i_c) \\ 0 \end{pmatrix}$$

$$= k_0 \begin{pmatrix} 1 \\ 1 \\ 1 \end{pmatrix} \cdot \begin{pmatrix} \cos(\phi_k)\cos(\theta_k) R\cos(\omega_{circ} T_c i_c) \\ \sin(\phi_k)\cos(\theta_k) R\sin(\omega_{circ} T_c i_c) \\ 0 \end{pmatrix}$$

$$= \vec{k}' \cdot \vec{x}'_{PC}(i_c)$$

If the PC trajectory is reformulated as above, it can be seen that the trajectory is transformed by the target angle. As a consequence, target one sees an ellipse which is different of the ellipse which is seen by target two. The trajectories, thus the phase code of targets at different angles, are different. If these phase codes are orthogonal to each other, then the angle discrimination is optimal.

B. Doppler discrimination

To a good approximation, the target velocity can be seen as constant within the coherent processing interval (CPI). In the formulation of a Doppler signature, the Doppler is added to the trajectory and justifies a linear with time increasing offset of the trajectory. Thus:

$$\varphi_k(t) = \vec{k}_k \cdot \vec{x}_{PC}(i_c) + \omega_{Dk} t$$

The Doppler offset $\omega_{Dk}$ is a slope in the phase term. The argumentation is the same as for the angle discrimination. If the Doppler shift transforms the trajectory such that the trajectory or phase code, respectively, is orthogonal to other Doppler shift, then the Doppler discrimination is optimal. Furthermore, if all Doppler and angle transformations, transform the trajectory such that all transformed versions of the trajectory are orthogonal to each other, then the joint angle-Doppler discrimination is optimal. As could seen, a sinusoidal approach provides good results, see FIG. 5.

C. Orthogonality in Trajectory

If a trajectory transformation provides orthogonality among trajectories, then it can also be considered that orthogonality in trajectory occurs for a target in same range, angle and Doppler bin. As previously mentioned, a circle can be orthogonal to a good approximation with respect to an ellipse. Different angular velocities yield orthogonality to a good approximation as well. Therefore, it can also be considered that arbitrary trajectories occur which are orthogonal to each other. A significant advantage is that the trajectory can be seen as a new degree of freedom in accordance with the design orthogonal of signals.

D. Reverse Approach

As pointed out earlier, if there is a transformation between target phase codes and AM or trajectory design, respectively, then a reverse approach can be applied for the trajectory concept discussed herein.

The invention claimed is:

1. A method for obtaining an angle-Doppler signature for a target using multiple-input-multiple-output (MIMO) radar, the MIMO radar including a transmit antenna array, the transmit antenna array being at least one-dimensional and having a plurality of antenna elements, the method comprising:

generating transmit signals for transmission by the transmit antenna array, the transmit signals defining at least a first transmit trajectory of a phase center within the transmit antenna array; and transmitting the transmit signals using the transmit antenna array;

receiving receive signals from the target, the receive signals resulting from the incidence of the transmit signals upon the target; and determining the angle-Doppler signature from the receive signals;

wherein the first transmit trajectory is such that, in operation, the phase center undergoes non-linear motion within the transmit antenna array.

2. The method according to claim 1, wherein the MIMO radar includes a receive antenna array, the receive antenna array being at least one-dimensional and having a plurality of antenna elements, wherein:

receiving the receive signals from the target comprises receiving the receive signals using the receive antenna array; and the receive signals define at least a first receive trajectory of a phase center within the receive antenna array.

3. The method according to claim 1, wherein the first transmit trajectory and the first receive trajectory are identical.

4. The method according to claim 1, wherein the first transmit trajectory and/or the first receive trajectory correspond to an amplitude modulation (AM) of the transmit signals.

5. The method according to claim 4, wherein the transmit signals are given by $$x(t) = w_{Tx}(t)e^{j\left(\omega_0 t + \frac{B}{T_c}t^2\right)}$$

where the vector $w_{Tx}(t)$ represents the AM, $\omega_0$ is the carrier angular frequency, B is the chirp bandwidth and $T_c$ the chirp duration.

6. The method according to claim 1, wherein the receive signals are given by $$y(t) = \sum_{k=1}^{K} A_k e^{j\omega_{Dk} t} S_k w_{Tx}(t) e^{j\left(\omega_0\left(t-\frac{r_k}{c_0}\right) + \frac{B}{T_c}\left(t-\frac{r_k}{c_0}\right)^2\right)}$$

where $\omega_0$ is the carrier angular frequency, $S_k$ is the MIMO channel matrix, $A_k$ is the k-th target radar cross section, $\omega_{Dk}$ is the k-th target Doppler shift, K is the total number of targets, $r_k$ is the target range, B is the chirp bandwidth, $T_C$ is the chirp duration and $c_0$ is the speed of light.

7. The method according to claim 6, further comprising down mixing the receive signals y(t) to obtain the down-mixed signal $y_{DM}(t)$, given by $$y_{DM}(t) = \sum_{k=1}^{K} c_k A_k e^{j\omega_{Dk} t} e^{-j\left(2\frac{Br_k}{T_c c_0}\right)} S_k w_{tx}(t)$$

where $$c_k = e^{-j\left(\omega_0 \frac{r_k}{c_0} - \frac{B}{T_c}\left(\frac{r_k}{c_0}\right)^2\right)}$$

and where the vector $w_{Tx}(t)$ represents the AM, $\omega_0$ is the carrier angular frequency, $S_k$ is the MIMO channel matrix, $A_k$ is the k-th target radar cross section, $\omega_{Dk}$ is the k-th target Doppler shift, K is the total number of targets, $r_k$ is the target range, B is the chirp bandwidth, $T_C$ is the chirp duration and $C_0$ is the speed of light.

8. The method according to claim 7, further comprising transforming the down-mixed signal $y_{DM}(t)$ to the discrete time domain to obtain baseband signals $y_{BB}(i_s)$, given by $$y_{BB}(i_s) = \sum_{k=1}^{K} c_k A_k e^{j\omega_{Dk} i_s T_s} e^{j(\omega_{Bk} i_s T_s)} S_k w_{Tx}(i_s T_s)$$

where the vector $w_{Tx}(t)$ represents the AM, $\omega_0$ is the carrier angular frequency, $\omega_{Bk}$ is the range corresponding beat frequency with regards to FMCW, $S_k$ is the MIMO channel matrix, $A_k$ is the k-th target radar cross section, $\omega_{Dk}$ is the k-th target Doppler shift, K is the total number of targets, $r_k$ is the target range, and $c_0$ is the speed of light.

9. The method according to claim 8, further comprising deriving, from the baseband signals $y_{BB}(i_s)$, a Doppler signature $y_{DS}(i_c)$, given by $$y_{DS}(i_c) = \sum_{k=1}^{K} c_k A_k e^{j\omega_{Dk} i_c T_c} S_k w_{Tx}(i_c T_c)$$

where $S_k w_{Tx}(i_c T_c)$ is a group factor $G_{Tx}$ of the transmit antenna array, given by $$G_{Tx}(i_c) = \sum_{n=1}^{N} w_{Txn}(i_c T_c) e^{jk_0 \sin(\phi_k) d_{Tx} n}$$

where $d_{Tx}$ is the inter-element spacing of transmit antenna elements, $\phi_k$ is the k-th target angle of arrival, the vector $w_{Tx}(t)$ represents the AM, $w_{Txn}$ is the n-th element of the amplitude modulation vector $w_{Tx}$, N is the total number of elements within $w_{Tx}$, $S_k$ is the MIMO channel matrix, $A_k$ is the k-th target radar cross section, $\omega_{Dk}$ is the k-th target Doppler shift, K is the total number of targets, $r_k$ is the target range, $T_C$ is the chirp duration, and $k_0$ is the free space wave number, and wherein the AM vector $w_{Tx}$ comprises the transmit phase center.

10. The method according to claim 9, wherein the first transmit trajectory and/or a second transmit trajectory are formed using a phase center position $x_{PC}$ defined by $$x_{PC}(i_c) = \frac{\partial}{\partial k_x} \arg(G_{Tx}(i_c))$$

where $k_x = k_0 \sin(\phi_k)$ and wherein $k_0$ is the free space wave number and $G_{Tx}$ is the group factor of the transmit antenna array.

11. The method according to claim 1, wherein the first transmit trajectory and/or the second transmit trajectory are formed such that the motion of the respective phase center is sinusoidal.

12. The method according to claim 11, further comprising deriving a Doppler signature $y_{DS}(i_c)$ from the receive signals according to $$y_{DS}(i_c) = c_k A_k e^{j\omega_{Dk} i_c T_c} e^{-jk_0 \sin(\phi_k) x_0 \sin(\omega_{CPI} T_c i_c)}$$

where $\omega_{CPI}$ is an angular frequency for a coherent processing interval (CPI) and is given by $$\omega_{CPI} = \frac{2\pi}{I_c T_c}$$

-continued where $c_k = e^{-j\left(\omega_0 \frac{r_k}{c_0} - \frac{B}{T_c}\left(\frac{r_k}{c_0}\right)^2\right)}$ and wherein ω is the carrier angular frequency, $A_k$ is the k-th target radar cross section, $\omega_{Dk}$ to is the k-th target Doppler shift, $r_k$ is the target range, $\phi_k$ is the k-th target angle of arrival, $k_0$ is the free space wave number, $x_0$ is the array size, B is the chirp bandwidth, $T_C$ is the chirp duration, and $C_0$ is the speed of light.

13. The method according to claim 1, wherein determining the angle-Doppler signature from the receive signals comprises using a filter bank wherein every combination of p and q is related to one filter of the filter bank such that each filter is given by $$y_{pq}(i_c) = e^{j\omega_{Dq} i_c T_c - jR_p \sin(\omega_{CPI} T_c i_c)}$$

where $$R_p = p\pi$$

$$\omega_{Dq} = q\omega_{CPI}$$

where $\omega_{CPI}$ is an angular frequency for a coherent processing interval (CPI) and is given by $$\omega_{CPI} = \frac{2\pi}{I_c T_c}$$

and wherein $r_k$ is the target range, $\phi_k$ is the k-th target angle of arrival, $k_0$ is the free space wave number, and $T_C$ is the chirp duration.

14. The method according to claim 13, wherein the output of the filter bank is calculated as $$\hat{j}_{pq} = \sum_{i_c=1}^{I_c} c_k A_k e^{j(\omega_{Dk} - \omega_{Dq})i_c T_c - j(R_k - R_p)\sin(\omega_{CPI} T_c i_c)}$$

where $R_k = \sin(\phi_k) k_0 x_0$ and $c_k = e^{-j\left(\omega_0 \frac{r_k}{c_0} - \frac{B}{T_c}\left(\frac{r_k}{c_0}\right)^2\right)}$ and wherein $A_k$ is the k-th target radar cross section, $\omega_0$ is the carrier angular frequency, $\omega_{Dk}$ is the k-th target Doppler shift, $r_k$ is the target range, $\phi_k$ is the k-th target angle of arrival, $k_0$ is the free space wave number, $x_0$ is the array size, B is the chirp bandwidth, $T_C$ is the chirp duration and $C_0$ is the speed of light and $$\omega_{Dq} = q\omega_{CPI}$$

where $\omega_{CPI}$ is an angular frequency for a coherent processing interval (CPI) and is given by $$\omega_{CPI} = \frac{2\pi}{I_c T_c}.$$

15. The method according to claim 14, further comprising deriving the Doppler from the order of output of the filter bank, preferably from the order of Bessel function in the case of sinusoidal PCM.

16. The method according to claim 14 further comprising deriving a target angle from the argument of the output of the filter bank.

17. The method according to claim 1, wherein the at least a first transmit trajectory comprises at least a first transmit trajectory and a second transmit trajectory and/or the at least a first receive trajectory comprises at least a first receive trajectory and a second receive trajectory.

18. The method according to claim 1, wherein the frequency of the first receive trajectory is different to that of the first transmit trajectory and/or the second receive trajectory is different to that of the second transmit trajectory.

19. The method according to claim 1, wherein the frequency of the first receive trajectory is half that of the first transmit trajectory and/or the second receive trajectory is half that of the second transmit trajectory.

20. The method according to claim 17, wherein the first transmit trajectory and the second transmit trajectory have different starting points and/or the first receive trajectory and the second receive trajectory have different starting points.

21. The method according to claim 17, wherein the first transmit trajectory is one of sine and cosine and the second transmit trajectory is the other of sine and cosine and/or the first receive trajectory is one of sine and cosine and the second receive trajectory is the other of sine and cosine.

22. The method according to claim 1, wherein the transmit antenna array and the receive antenna array are 2-dimensional or the transmit antenna array and the receive antenna array are 3-dimensional.

23. The method according to claim 1, wherein determining the Doppler signature from the receive signals comprises determining an angle-Doppler signature $y_{DS}(i_c)$ as $$y_{DS}(i_c) = \sum_{k=1}^{K} c_k A_k e^{j\omega_{Dk} i_c T_c} e^{-jk_0 \sin(\phi_k) x_{PC}(i_c)}$$

where $c_k = e^{-j\left(\omega_0 \frac{r_k}{c_0} - \frac{B}{T_c}\left(\frac{r_k}{c_0}\right)^2\right)}$ and $\omega_0$ is the carrier angular frequency, $r_k$ is the target range, B is the chirp bandwidth, $C_0$ is the speed of light, $A_k$ is the k-th target radar cross section, K is the total number of targets, $\omega_{Dk}$ is the k-th target Doppler shift, $T_c$ is the chirp duration, $k_0$ is the free space wave number, $\phi_k$ is the k-th target angle of arrival, $x_{PC}(i_c)$ is the phase center trajectory in x-direction.

24. The method according to claim 1, further comprising determining an argument of angle-Doppler signature $Y_{DS}(i_c)$ as $$\varphi_k(t) = \vec{k}_k \cdot \vec{x}_{PC}(i_c)$$

$$\vec{k}_k = k_0 \begin{pmatrix} \cos(\phi_k)\cos(\theta_k) \\ \sin(\phi_k)\cos(\theta_k) \\ \sin(\theta_k) \end{pmatrix}$$

where $\vec{x}_{PC}$ is the phase center trajectory on a 3 dimension structure, $k_0$ is the free space wave number and ok the k-target angle of arrival;
and discriminating targets based on the determined $\varphi_k(t)$.

25. The method according to claim 1, further comprising determining a Doppler $\omega_{Dk}$ from $$\varphi_k(t) = \vec{k}_k \cdot \vec{x}_{PC}(i_c) + \omega_{Dk} t$$

where $\vec{x}_{PC}$ is the phase center trajectory on a 3 dimension structure and $\omega_{Dk}$ is the k-th target Doppler shift;
and discriminating targets based on the determined $\omega_{Dk}$.

26. A system for obtaining an angle-Doppler signature for a target using multiple-input-multiple-output (MIMO) radar, the system comprising
- a transmit antenna array, the transmit antenna array being at least one-dimensional and having a plurality of antenna elements; and
- processing circuitry, coupled to the transmit antenna array, the processing circuitry being configured to carry out the method of claim 1.

27. The system according to claim 26, further comprising a receive antenna array coupled to the processing circuitry, the receive antenna array being at least one-dimensional and having a plurality of antenna elements.

28. A non-transitory computer readable medium storing instructions which, when executed by processing circuitry, perform the method of claim 1.

* * * * *